United States Patent
Schneider (10) Patent No.: US 7,978,222 B2
(45) Date of Patent: Jul. 12, 2011

(54) SYSTEMS AND METHODS FOR IMAGE STABILIZATION

(75) Inventor: Alexander Caldwell Schneider, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 404 days.

(21) Appl. No.: 12/040,882

(22) Filed: Mar. 1, 2008

(65) Prior Publication Data

US 2009/0219402 A1    Sep. 3, 2009

(51) Int. Cl.
*H04N 5/228* (2006.01)
*G06K 9/40* (2006.01)
*G06K 9/32* (2006.01)

(52) U.S. Cl. .............. 348/208.5; 348/208.1; 382/275; 382/293

(58) Field of Classification Search ........... 348/208.1, 348/208.5, 208.13
See application file for complete search history.

(56) References Cited

U.S. PATENT DOCUMENTS

| | | | |
|---|---|---|---|
| 6,122,004 A * | 9/2000 | Hwang | 348/208.13 |
| 6,680,749 B1 * | 1/2004 | Anderson et al. | 348/231.99 |
| 6,974,947 B2 | 12/2005 | Black et al. | |
| 6,992,700 B1 * | 1/2006 | Sato et al. | 348/208.2 |
| 7,783,133 B2 * | 8/2010 | Dunki-Jacobs et al. | 382/296 |
| 2005/0212911 A1 * | 9/2005 | Marvit et al. | 348/154 |
| 2006/0061660 A1 * | 3/2006 | Brackmann | 348/208.1 |
| 2009/0002501 A1 * | 1/2009 | Silsby et al. | 348/208.16 |
| 2009/0135264 A1 * | 5/2009 | John | 348/220.1 |

* cited by examiner

*Primary Examiner* — Sinh Tran
*Assistant Examiner* — Albert H Cutler (57) ABSTRACT

An image capture device includes a frame buffer, a processor, a shutter, an actuator, a three-axis optical motion sensor and an image sensor. The image sensor defines an optical axis. The three-axis optical motion sensor provides information concerning rotational movement of the camera about each of a roll axis, a yaw axis and a pitch axis. The roll axis is parallel to the optical axis. The yaw axis and the pitch axis are orthogonal to one another and orthogonal to the roll axis. The actuator rotates the image sensor in response to the rotational movement of the device about the optical axis. The processor generates first and second offsets responsive to the rotational motion about the yaw axis and the pitch axis. The processor shifts each line of image information in a frame in accordance with the first and second offsets.

9 Claims, 9 Drawing Sheets

SYSTEMS AND METHODS FOR IMAGE STABILIZATION

BACKGROUND

Images captured via a camera are subject to blurriness introduced through unintentional vibration of the camera body, elements within the camera or elements within the camera lens. Photographers and videographers have employed tripods or other stable supports to ensure sharper images. However, it is often the case that a stable tripod or other support for the camera is unavailable. Consequently, photographers and videographers often use still and video cameras that employ image stabilization techniques.

Image stabilized lenses and cameras use small gyroscopes or other sensors and mechanical systems to counteract camera or lens motion to obtain sharper images. Image stabilizers produce sharper images by counteracting measured motion. Signals, generated by the gyroscopes, are sent to a servo motor, which moves lens elements, a prism, or a sensor plane in the opposite direction of camera or lens motion. Larger gyroscopic stabilizers can steady an entire camera body and lens assembly, whether the lens assembly is optically stabilized or not.

An optical image stabilizer, often abbreviated as OIS, is a mechanism used in a still camera or video camera that stabilizes the recorded image by varying the optical path to the sensor. This technology is implemented in the lens itself, rather than in the camera or via a tripod mount. An OIS reduces the size and weight of the camera assembly and enables the lens assembly to be fine-tuned to match characteristics of that particular lens assembly and adjust for present environmental conditions. Vibration signals are generally acquired using two piezoelectric sensors. The sensors react to angular velocity. One of the sensors detects horizontal movement. The other sensor detects vertical movement. As a result, an OIS corrects for pitch and yaw axis rotations only. No correction is possible for rotation about the optical axis.

Digital image stabilization is used in some video cameras. This image stabilization technique moves the electronic image from frame to frame to counteract motion. Generally, pixels outside of the border of the visible frame are captured and available to shift the visible frame as may be required to buffer motion between frames.

Some image processing systems use stabilization filters that can correct a blurry image by tracking the movement of pixels in the image and correcting the image. The process is similar to digital image stabilization. However, these image processing systems often use image information from the image sensor to determine when image information has moved. Such systems typically use multiple exposures with dedicated frame buffers for each exposure and a competent processor to perform correlation calculations to sense relative motion between subexposures, leading to a significant increase in unit cost. In addition, systems that use stabilization filters often extrapolate image information in an attempt to recreate lost image information at the edge of a frame.

As cameras become smaller and sensor resolutions increase, captured images will become more sensitive to mechanical disturbances during exposure. For cameras with a wide field of view, such as cameras integrated in mobile phones, rotation about the optical axis is a significant obstacle to the acquisition of high-quality images. Mechanical disturbances between the camera and the subject or within the camera in yaw and pitch directions will continue to be important to the acquisition of high-quality images.

Therefore, it would be desirable to provide a low cost, reliable and integrated image stabilization solution that can perform across a range of image capture devices and environmental conditions.

SUMMARY

An embodiment of an image capture device (e.g., a camera) comprises a body housing a frame buffer, a processor, a shutter, an actuator, a three-axis optical sensor and an image sensor. The processor is coupled to the frame buffer, the shutter, the actuator, the three-axis optical sensor and the image sensor. The image sensor defines an optical axis. The three-axis optical sensor has a roll axis, a yaw axis and a pitch axis. The roll axis is parallel to the optical axis. The yaw axis and the pitch axis are orthogonal to one another and both the yaw axis and the pitch axis are orthogonal to the roll axis. The actuator rotates the image sensor in accordance with information from the three-axis optical sensor responsive to rotation of the body about the optical axis. The processor applies an image processing algorithm in accordance with information from the three-axis optical sensor responsive to rotation of the body about the yaw axis and rotation of the body about the pitch axis.

An embodiment of a method for stabilizing an image by counteracting motion of the body of the image capture device includes the steps of using an optical sensor to provide information concerning rotational movement about an optical axis, movement about a yaw axis, and movement about a pitch axis, using the information concerning rotational movement about the optical axis to rotate an image sensor about the optical axis, and applying information concerning movement about the yaw axis and movement about the pitch axis to a post acquisition processor configured to reduce the effects of movement about both the yaw axis and the pitch axis in an output image generated by the image capture device.

The figures and detailed description that follow are not exhaustive. The disclosed embodiments are illustrated and described to enable one of ordinary skill to make and use the systems and methods for image stabilization. Other embodiments, features and advantages of the systems and methods for image stabilization will be or will become apparent to those skilled in the art upon examination of the following figures and detailed description. All such additional embodiments, features and advantages are within the scope of the assemblies and methods as defined in the accompanying claims.

BRIEF DESCRIPTION OF THE FIGURES

The systems and methods for image stabilization can be better understood with reference to the following figures. The components within the figures are not necessarily to scale, emphasis instead being placed upon clearly illustrating the principles of the image capture device. Moreover, in the figures, like reference numerals designate corresponding parts throughout the different views.

DETAILED DESCRIPTION

Although described with particular reference to a digital camera or a multiple-function handheld device such as a camera phone, the systems and methods for image stabilization can be implemented in any system where it is desirable to reduce the adverse effects of motion between a subject and an image capture device.

When a shutter is triggered by an operator of the image capture device, an optical sensor records high-resolution yaw, pitch and roll information. An example high-resolution optical sensor for operation in one dimension is found in U.S. Pat. No. 6,974,947, which is incorporated by reference in its entirety. A roll information signal, which conveys information about rotational movement of an image sensor in the image capture device about an optical axis is used to rotate the image sensor about the optical axis in a direction opposite the identified rotational movement, resulting in the image sensor detecting a subject without roll but still subject to relative motion in the yaw and pitch directions. The actuator moves the image sensor through an angle of only about 1 degree to provide a substantial improvement in an output image.

An actuator capable of rotating the image sensor through an angle of less than about 5 degrees is considerably less expensive and more compact than a pair of linear actuators that would be required to move either the image sensor or a lens element horizontally with respect to the other to correct for undesired yaw of the image capture device and vertically with respect to each other to correct for undesired pitch of the image capture device. A yaw information signal and a pitch information signal are used separately in a non-mechanical solution to further correct the roll-free image that impinges the image sensor.

In one embodiment, the image capture device uses a single-frame post acquisition algorithm, which is applied over the roll-free image data to remove shift-invariant motion blur.

In an alternative embodiment, the image capture device collects multiple short exposures and shifts image information from each of the individual exposures according to respective instantaneous yaw and pitch errors or offsets. The shifted exposures are accumulated to generate an output image. A processor receives yaw and pitch angles from an optical sensor (e.g., such as the optical sensor in U.S. Pat. No. 6,974,947) and computes first and second offsets, each in units of pixels. As each line of data is read from the image sensor, the processor shifts the relative location of the image information in accordance with the first and second offsets and saves the result in an accumulation buffer. The offsets are defined by orthogonal vectors in alignment with the plane of the image sensor. The offsets are applied frame wide. For example, if the first offset is defined along the width of the image sensor and the second offset is defined along the height of the image sensor, when the frame wide yaw and pitch error information leads to a first offset of 3 pixels and a second offset of 5 pixels, image information for an image data line starting at (0; 50) and ending at (2,000; 50) is shifted to replace the existing values in a frame buffer from (3; 55) to (2,003; 55). This methodology avoids any issues with lost image information found in systems that crop image information or any issues with erroneously generated image information often found in systems that interpolate image information. The present embodiment uses a single frame or accumulation buffer and modest processing capabilities because the optical motion sensor obviates the need for motion detection from image data, allowing for an inexpensive implementation in standalone cameras or camera phones.

In a variation of the above-described multiple exposure approach, the image capture device uses two frame buffers. A first frame buffer captures subexposures from the image sensor. A second frame buffer is used for accumulating the output image. This embodiment allows exposure time associated with one subexposure to be used for performing the shifted accumulation for the last subexposure. As a result, for the expense of additional an additional frame buffer (i.e., memory), a reduction in the peak data bandwidth and a decrease in total shutter time are achieved.

Individual components of an image capture device such as a camera phone can be implemented in software or various combinations of software and hardware. When implemented in hardware, a two-axis stabilizer (i.e., a yaw-pitch stabilizer) of the image capture device can be implemented on a single integrated circuit (e.g., an application specific integrated circuit) or using separate hardware elements and logic. When the yaw-pitch stabilizer is implemented partially in software, the software portion can be used to shift image information received from a roll-free or roll-reduced image sensor to generate improved output images with reduced motion artifacts. The software can be stored in a memory and executed by a suitable instruction execution system (e.g., a microprocessor). A hardware implementation of the yaw-pitch stabilizer can include any or a combination of the following technologies, which are all well known in the art: discrete electronic components, discrete logic circuit(s) having logic gates for implementing logic functions upon data signals, an application specific integrated circuit having appropriate logic gates, a programmable gate array(s) (PGA), a field programmable gate array (FPGA), etc.

The software for the yaw-pitch stabilizer comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

A roll stabilizer is a hardware device that compensates in real time for rotation about the optical axis of the image capture device. The roll stabilizer includes an optical motion sensor, an actuator and the image sensor. The actuator is connected to the image sensor via a linkage, gears or other mechanisms for controllably rotating the image sensor about the optical axis.

Figure 1:
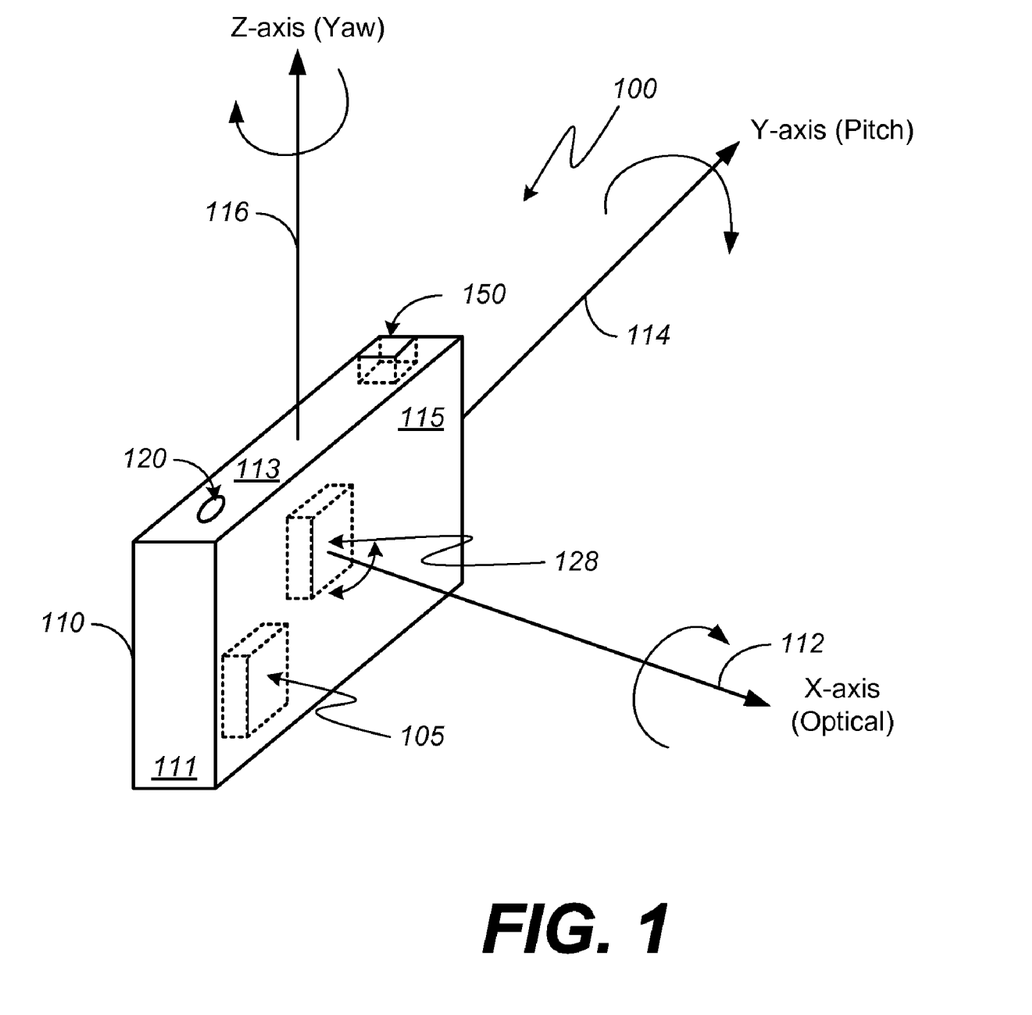
FIG. 1 is a simplified perspective view of an embodiment of an image capture device.

Turning now to the drawings, wherein like reference numerals designate corresponding parts throughout the drawings, reference is made to FIG. 1, which illustrates a simplified perspective view of an embodiment of an image capture device or camera 100. The camera 100 has a body 110, which houses a two-axis stabilizer (i.e., the yaw-pitch stabilizer) 105 and a roll stabilizer 128. The yaw-pitch stabilizer 105 is a non-mechanical image stabilizer that includes a processor and a memory that will be described in detail in association with the embodiments illustrated in FIGS. 4 and 6. The roll stabilizer 128 is an electromechanical device that includes a roll detector, an actuator and an image sensor. The roll stabilizer 128 will also be described in greater detail in association with the embodiments illustrated in FIGS. 4 and 6.

The yaw-pitch stabilizer 105 and the roll stabilizer 128 operate in response to error signals generated by three-axis optical motion sensor 150. The three-axis optical motion sensor 150 has a first upward facing optical array that is used to generate an error signal responsive to rotational movement about the Z-axis 116 (i.e., the yaw-axis), which extends vertically from the body 110. The three-axis optical motion sensor 150 also includes an away facing optical array that is used to generate an error signal responsive to rotational movement about the Y-axis 114 (i.e., the pitch-axis). The three-axis optical motion sensor 150 also includes a rearward facing optical array that is used to generate an error signal responsive to rotational movement about the X-axis 112 (i.e., the optical-axis). An example optical motion sensor suitable for determining an error angle is described in U.S. Pat. No. 6,974,947. The error angle is determined using information received and the relative position of two elements from each optical array. The principles described therein can be used to produce the three-axis optical motion sensor 150.

In the illustrated embodiment, the body 110 is a parallelepiped. A side surface 111, a forward facing surface 115 and an upward facing surface 113 are visible. A downward facing surface, a rearward facing surface and an opposing side surface are hidden. However, in other embodiments, the body 110 can take any number of physical shapes and sizes. In the illustrated embodiment, a shutter control 120 is located on the upward facing surface 113 of the body 110. In response to an operator input introduced via the shutter control 120, the camera 100 produces an output image with reduced motion-induced blur. The camera 100 may be implemented with relatively small and inexpensive components that have modest processing power and modest memory capacity. As a result, the camera 100 is suitable for incorporation in compact camera environments that have significant size, processing, and memory constraints, including but not limited to hand-held electronic devices (e.g., a mobile telephone, a cordless telephone, a personal digital assistant (PDA), a portable music player, or a video camera), laptop computers, and other embedded environments.

While the three-axis optical motion sensor 150 is illustrated on a corner of the body 110 it should be understood that each of the component optical arrays or sensors can be arranged in any location that places the optical array in a plane that is orthogonal to the corresponding axis. For example, the optical array associated with the optical motion sensor responsible for determining movement about the optical axis may be placed anywhere along the face of the forward facing surface 115 or anywhere along the face of the opposing rearward facing surface where a line-of-sight to a suitable subject could be maintained to determine motion of the camera body about the optical axis. By way of further example, the optical array associated with the optical motion sensor responsible for determining movement about the yaw axis may be placed anywhere along the upward facing surface 113 or anywhere along the face of the opposing downward facing surface where a line-of-sight to a suitable subject could be maintained to enable the sensor to detect motion about the yaw axis. Similarly, the optical array associated with the optical motion sensor responsible for determining movement about the pitch axis may be placed anywhere along the side surface 111 or anywhere along the face of the opposing side surface where a line-of-sight to a suitable subject could be maintained to enable the sensor to detect motion about the pitch axis.

Figure 2A:
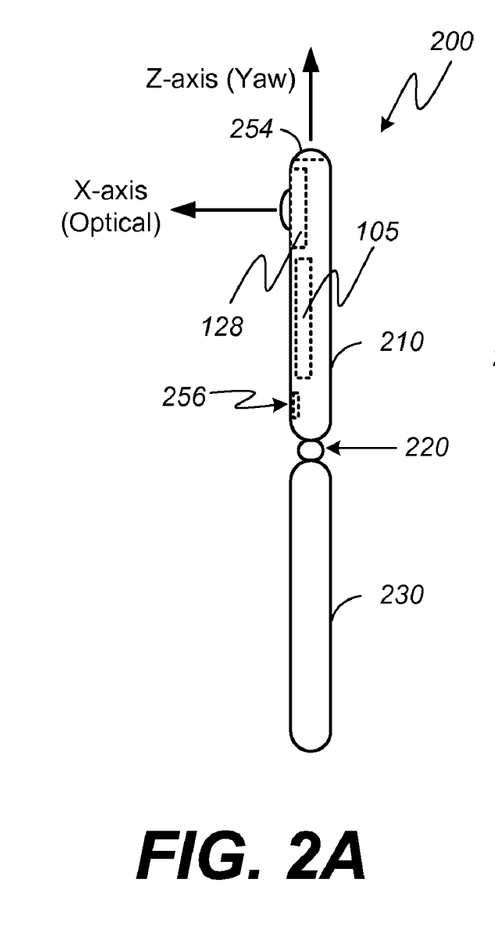
FIGS. 2A-2C are left-side, front and right-side views, respectively, of an embodiment of a camera phone.
Figure 2B:
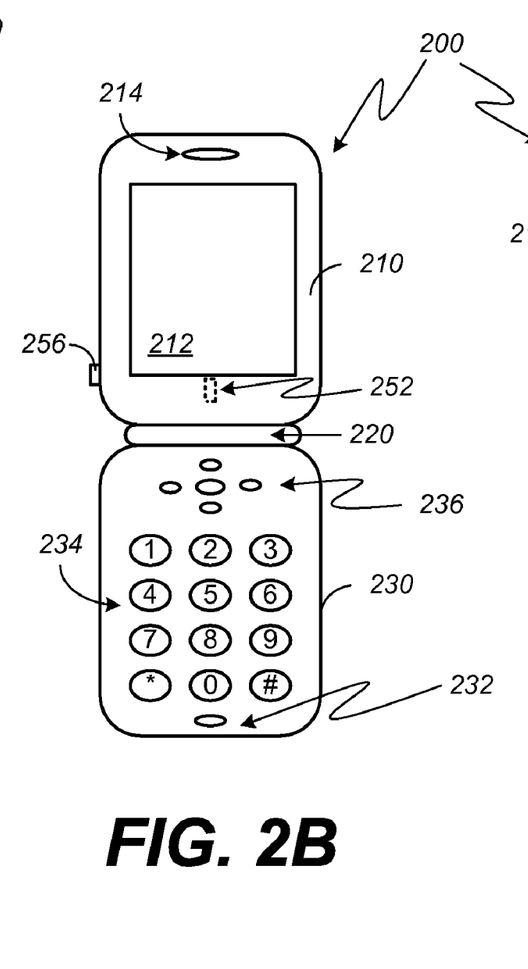
Figure 2C:
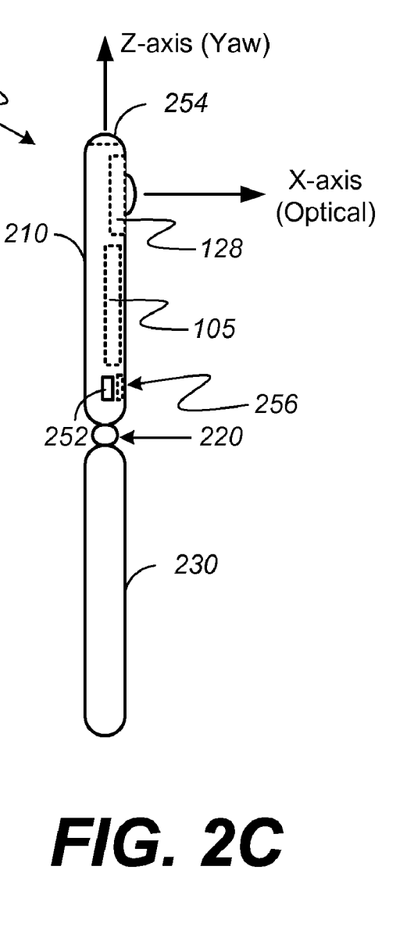

FIGS. 2A-2C are left-side, front and right-side views, respectively, of an embodiment of a camera phone 200. In the illustrated embodiment, the camera phone 200 is an example of one possible form factor. The camera phone 200 is not limited to a single form factor.

The camera phone 200 includes the non-mechanical yaw-pitch stabilizer 105 and the electromechanical roll stabilizer 128 of the camera 100 of FIG. 1. The camera phone 200 includes an upper housing 210, a lower housing 230 and a hinge 220. The hinge 220 enables an interior face of the upper housing 210 to close in a clamshell fashion over an interior face of the lower housing 230. The left-side view (FIG. 2A) includes optical array 252, optical array 254 and optical array 256. The optical array 256 is positioned in a plane that is orthogonal to the X-axis or optical axis of the camera phone 200. The optical array 254 is positioned in a plane that is orthogonal to the Z-axis or yaw axis of the camera phone 200. The optical array 252 is positioned in a plane that is orthogonal to the Y-axis or pitch axis of the camera phone 200. In both the left-side and right-side views the pitch axis is in a direction into and out from the page. The front view (FIG. 2B) shows that the upper housing 210 includes a display 212 and a speaker 214 and that the lower housing 230 includes a microphone 232, an array of telephonic pushbuttons 234 and an array of navigation and functional pushbuttons 236. When the camera phone 200 is operating in a camera or image acquisition mode one of the functional pushbuttons 236 or another pushbutton (not shown) will initiate an image acquisition sequence.

When the camera phone 200 is operating as a wireless telephone, a telephone subsystem uses the microphone 232 to convert received sound into electrical signals for transmission and speaker 214 to convert received electrical signals into audio signals. The telephone subsystem communicates the electrical or telephony signals over a radio-frequency communications channel. The radio-frequency communications channel couples the camera phone 200 to a wireless telephone network, which is further coupled to wired communication networks.

Figure 3A:
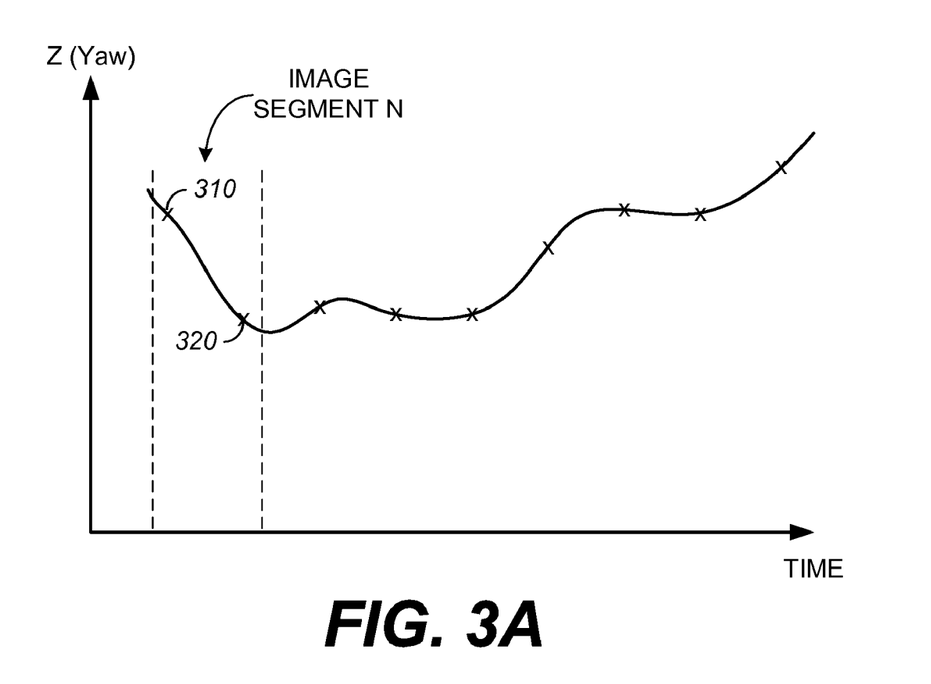
FIGS. 3A and 3B are example plots of a position—time relationship of the camera phone of FIGS. 2A-2C in the yaw axis and the pitch axis, respectively.
Figure 3B:
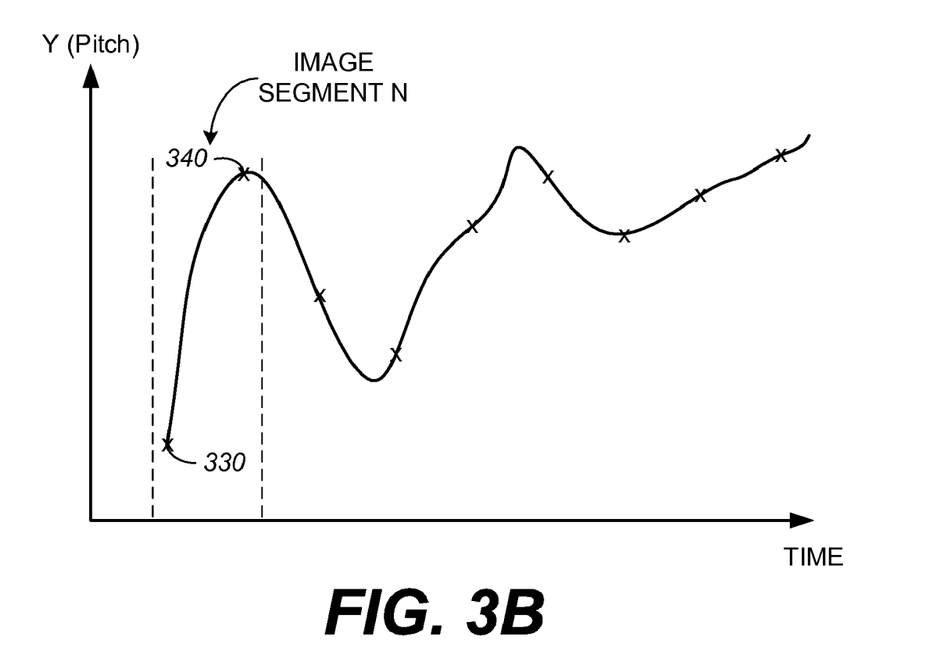

FIGS. 3A and 3B are example plots of a position—time relationship of the camera phone 200 of FIGS. 2A-2C in the yaw axis and the pitch axis, respectively, during an image acquisition sequence. The example plots show exemplary sets of position coordinates that are determined from the three-axis optical motion sensor 150 during a frame exposure period. FIG. 3A includes position coordinates illustrating displacement of the body 110 in the yaw direction. FIG. 3B includes position coordinates illustrating displacement of the body 110 in the pitch direction. The sampling rate of the optical motion sensor error signals responsible for determining yaw (Z) and pitch (Y) position coordinates and the number of scan lines in each image segment supplied by the image sensor are selected so that a processing algorithm can associate at least two movement measures (i.e., position coordinates or displacements) with each image segment. For example, image segment N includes first position 310 and second position 320 in the yaw direction, as shown in FIG. 3A, and third position 330 and fourth position 340 in the pitch direction, as shown in FIG. 3B. The relative location of the first position 310 and second position 320 is indicative of displacement in the negative yaw direction of the body 110. The relative location of the third position 330 and the fourth position 340 is indicative of displacement in the positive pitch direction of the body 110.

Figure 4:
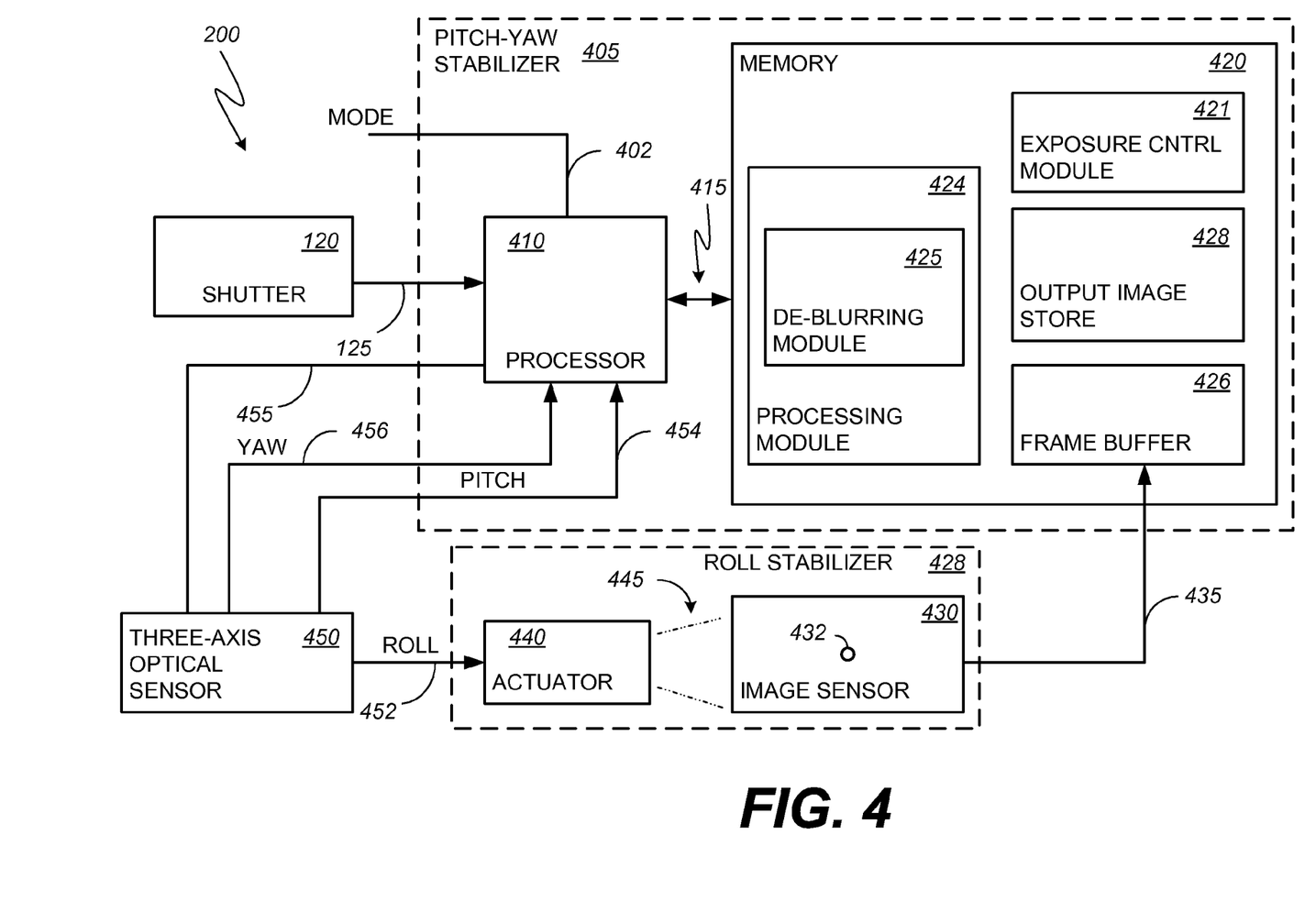
FIG. 4 is a functional block diagram illustrating an embodiment of the camera phone of FIGS. 2A-2C.

FIG. 4 is a functional block diagram illustrating an embodiment of the camera phone 200 of FIG. 2. For simplicity of illustration and explanation, only image acquisition features of the camera phone 200 are shown in FIG. 4. The camera phone operates in accordance with an operator input at the shutter control 120 and an optional mode control signal. The shutter control 120 initiates an image acquisition process. When accompanied by a predefined mode control signal, the image acquisition process is modified by operation of the pitch-yaw stabilizer 405 and the roll stabilizer 428 to reduce image artifacts or blurriness in an output image. In an alternative mode, defined by a different state of the mode control signal, the camera phone 200 acquires an output image via operation of the image sensor 430 and a frame buffer 426 without image stabilization. The mode control signal is communicated via connection 402 to a processor 410, which is configured to operate in conjunction with executable instructions in a processing module 424 stored in the memory 420 to coordinate operation of the camera phone 200.

The camera phone 200 includes a pitch-yaw stabilizer 405 and a roll stabilizer 428 that operate in accordance with error signals received from the three-axis optical motion sensor 450. The three-axis optical motion sensor 450 is coupled to the processor 410 via connection 455. The processor 410 provides one or more signals along connection 455 to controllably enable one or more of the individual optical sensor elements within the three-axis optical motion sensor 450. The pitch-yaw stabilizer 405 receives a yaw-error signal from the three-axis optical motion sensor 450 via connection 456. In addition, the pitch-yaw stabilizer 405 receives a pitch-error signal via connection 454. A roll error signal provided by the three-axis optical motion sensor 450 is forwarded to the roll stabilizer 428 via connection 452.

The roll stabilizer 428 includes an image sensor 430 coupled to actuator 440 via rotator 445. The actuator is a physical device that moves in response to the roll error signal received from the three-axis optical motion sensor on connection 452. The actuator works in conjunction with the rotator 445 to adjust the image sensor 430 about pivot 432 in a direction of rotation that opposes the measured rotation of the camera phone 200 about the optical axis. The rotator 445 may be a linkage, a gear or other physical connection that translates motion induced by the actuator 400 into a desired rotational displacement of the image sensor 430. Operation of the roll stabilizer 428 reduces any blurring effects due to roll or rotation about the optical axis of the camera phone 200. The range of rotational displacement may be on the order of ±5 degrees. Simulations indicate that rotational displacement of approximately ±1 degree will provide a substantial benefit.

The image sensor 430 may be any type of imaging device that is capable of capturing one-dimensional or two-dimensional images of a scene. A one-dimensional image includes information associated with one row, one column, or a portion of a single row or column in an image sensor. A two-dimensional image includes the image information associated with multiple rows, multiple columns, combinations of rows and columns of an image sensor. The image sensor 430 includes at least one image sensing component with a respective light sensing active area. Exemplary image sensing components include charge coupled devices (CCDs) and complementary metal-oxide-semiconductor (CMOS) devices. The light sensing active area, which includes pixels arranged in rows and columns, defines a capture plane that is orthogonal to the optical axis. Although not illustrated in any of the example embodiments, the image sensor 430 may include or be arranged with one or more lenses that focus incident light onto the light sensitive active area. As illustrated in FIG. 4, the image sensor 430 is coupled via connection 435 to memory 426 (e.g., the frame buffer 426).

The pitch-yaw stabilizer 405 includes a processor 410 and a memory 420 coupled to one another via a bus 415. The bus 415 enables communication of data signals between the processor 410 and the memory 420. The processor 410 is a hardware device for executing programs or sets of executable instructions, particularly those instructions stored in memory 420. The processor 410 can be any custom made or commercially available processor, a central processing unit (CPU), or an auxiliary processor among several processors associated with the camera phone 200. The memory 420 can include any one or a combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM). Note that the memory 420 can have a distributed architecture, where various components are situated remote from one another, but can be accessed by the processor 410.

The memory 420 may include one or more separate programs, each of which comprises an ordered listing of executable instructions for implementing logical functions. In the example embodiment illustrated in FIG. 4, the memory 420 includes a frame buffer 426 and an output image store 428, as well as a processing module 424. The image sensor 430 is operated in accordance with a rolling shutter capture process, as coordinated by the exposure control module 421, in which each row of pixels of the image sensor is sequentially scanned in order. A rolling shutter capture process is implemented by sequentially resetting and reading the pixels of a two-dimensional CMOS photocell array row-by-row or column-by-column in a series of scan lines until the entire active area of the image sensor has been scanned. The exposure interval of each scan line is the time between the reset and readout, and the frame exposure period is the time needed to readout all the scan lines.

The processing module 424 reduces the appearance of blur that might be caused by motion of the camera phone 200 including the image sensor 430 during a rolling shutter capture process. The processing module 424 includes a deblurring module 425. The deblurring module 425 deblurs the image information in frame buffer 426 based on one or both of the yaw-error signal and the pitch-error signal. The deblurring module 425 receives the error signals from the three-axis optical motion sensor 450 and determines the type of relative motion between the image sensor 430 and the scene based on the movement measures. In general, the type of relative motion can include one or more of a translation, a rotation, and a sudden change of scale. In some embodiments, the deblurring module 425 is operable to determine any one of these types of relative motion and selects an appropriate blur model for application on the image information. The deblurring module 425 estimates a point-spread function that corresponds to a one-dimensional motion blur defined by a corresponding motion vector. The deblurring module 425 generates a respective deblurred output image by deconvolving the image information based on the corresponding estimated point-spread function. In general, the deblurring module 425 may generate the deblurred output image using any of a wide variety of deconvolution processes, including but not limited to an inverse filtering deconvolution process, a Wiener filtering deconvolution process, and a Richardson-Lucy deconvolution process.

The exposure control module 421 and deblurring module 425 are not limited to any particular firmware, or software configuration, but rather they may be implemented in any computing or data processing environment, including in digital electronic circuitry (e.g., an application-specific integrated circuit, such as a digital signal processor (DSP)) or in computer hardware, firmware, or software.

When implemented in hardware, the exposure control module 421 and deblurring module 425 can be implemented in any or a combination of the following technologies, which are all well known in the art: discrete electronic components, discrete logic circuit(s) having logic gates for implementing logic functions upon data signals, an application specific integrated circuit having appropriate logic gates, a programmable gate array(s) (PGA), a field programmable gate array (FPGA), etc.

The software (i.e., the executable instructions) associated with the exposure control module 421 and the deblurring module 425 comprise an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Storage devices suitable for tangibly embodying these instructions and data include all forms of non-volatile memory, including, for example, semiconductor memory devices, such as EPROM, EEPROM, and flash memory devices.

Figure 5:
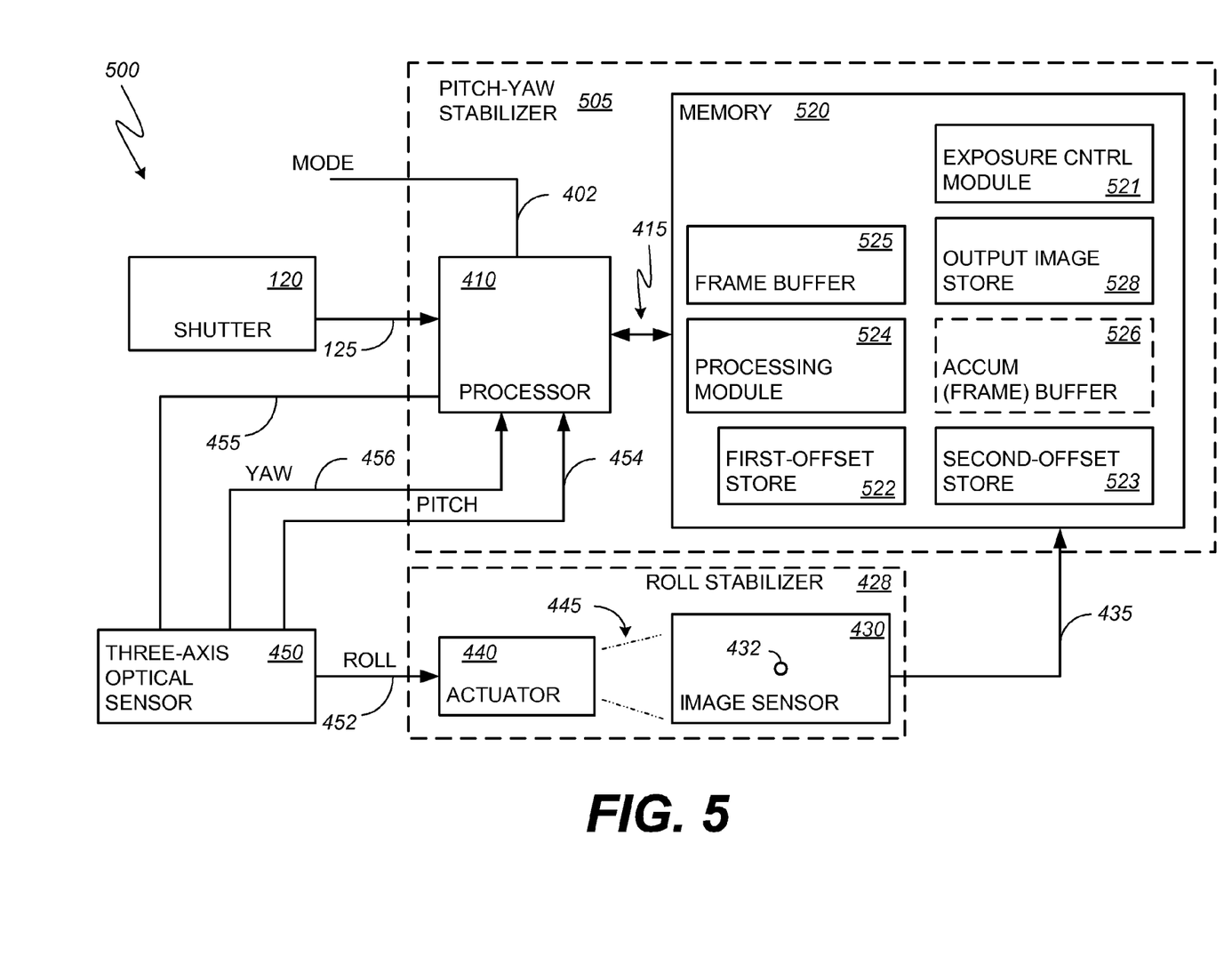
FIG. 5 is a functional block diagram illustrating an alternative embodiment of the camera phone of FIGS. 2A-2C.

FIG. 5 is a functional block diagram illustrating an alternative embodiment of the camera phone of FIG. 2. The camera phone 500 includes the pitch-yaw stabilizer 505 and the memory 520. The pitch-yaw stabilizer 505 applies a second non-mechanical image correction technique that uses multiple short exposures to construct an output image. In response to operation of the shutter 120, the camera phone 500 determines instantaneous pitch and yaw error signals as described above. The camera phone 500 computes a first offset in pixels corresponding to the shift required in one of the row or column dimensions of the image data read from the roll stabilized image sensor 430 to deblur or correct the image. The camera phone 500 further computes a second offset in pixels corresponding to the shift required in the other of the row or column dimensions of the image data read from the roll stabilized image sensor 430 to deblur or correct the image.

In this embodiment, the memory 520 includes an exposure control module 521, a first offset store 522, a second offset store 523, a processing module 524, a frame buffer 525, an optional accumulation (frame) buffer 526, and an output image store 528. The exposure control module 521 uses the image sensor 430 to capture multiple exposures. The exposure control module 521 divides a frame exposure period into a set of image segment exposure intervals. Each of the image segment exposure intervals encompasses the exposure intervals of one or more of the scan lines that are captured during the frame exposure period. The processing module 524, as executed by the processor 410, uses the instantaneous pitch-error signal on connection 454 and the instantaneous yaw-error signal on connection 456 to compute from them the first offset and the second offset. The first offset store 522 holds the value of the first offset. The second offset store 523 holds the value of the second offset.

As will be explained in further detail in association with FIG. 6, the processing module 524 uses the first value to identify the distance in pixels that image information should be shifted in a first direction in the frame buffer 525 to reduce blur in an output image due to motion of the camera phone 200. The first direction or first shift corresponds to an integer number of rows or columns in the frame buffer 525. The processing module 524 also uses the value in the second offset store 523 to identify the distance in pixels that image information should be shifted in a second direction in the frame buffer 525 to reduce blur in an output image due to motion of the camera phone 200. The second direction or second shift corresponds to an integer number of rows or columns in the frame buffer 525. When the first direction corresponds to rows of the frame buffer 525, the second direction will correspond to columns of the frame buffer 525. When the first direction corresponds to columns of the frame buffer 525, the second direction will correspond to rows of the frame buffer 525.

As each line of image data is read from the image sensor 430, the data is written into frame buffer 425 in a location determined by the first and second offsets. Because each line of image data uses the same offsets there are no issues with interpolation and the solution can be implemented with a single frame buffer (e.g., frame buffer 525) and a processor (e.g., processor 410) with modest processing capabilities. The present system uses a single frame buffer to accumulate a final output image and significantly less processing resources because the three-axis optical motion sensor 450 obviates the need to detect motion from image data acquired by the image sensor 430.

The optional accumulation or frame buffer 526 is applied in a variation of the above described multiple exposure deblurring process. In this alternative approach, the frame buffer 525 is used for capturing subexposures from the image sensor 430. The accumulation buffer 526 is used for accumulating the output image. For the expense of the additional memory capacity associated with the accumulation buffer 526, a portion of the total exposure time can be used for accomplishing the shifted accumulation for the last subexposure.

The exposure control module 521 and processing module 524 are not limited to any particular firmware, or software configuration, but rather they may be implemented in any computing or data processing environment, including in digital electronic circuitry (e.g., an application-specific integrated circuit, such as a digital signal processor (DSP)) or in computer hardware, firmware, or software.

When implemented in hardware, the exposure control module 521 and processing module 524 can be implemented in any or a combination of the following technologies, which are all well known in the art: discrete electronic components, discrete logic circuit(s) having logic gates for implementing logic functions upon data signals, an application specific integrated circuit having appropriate logic gates, a programmable gate array(s) (PGA), a field programmable gate array (FPGA), etc.

The software (i.e., the executable instructions) associated with the exposure control module 521 and the processing module 524 comprise an ordered listing of executable instructions for implementing logical functions, and can be embodied in any computer-readable medium.

Figure 6:
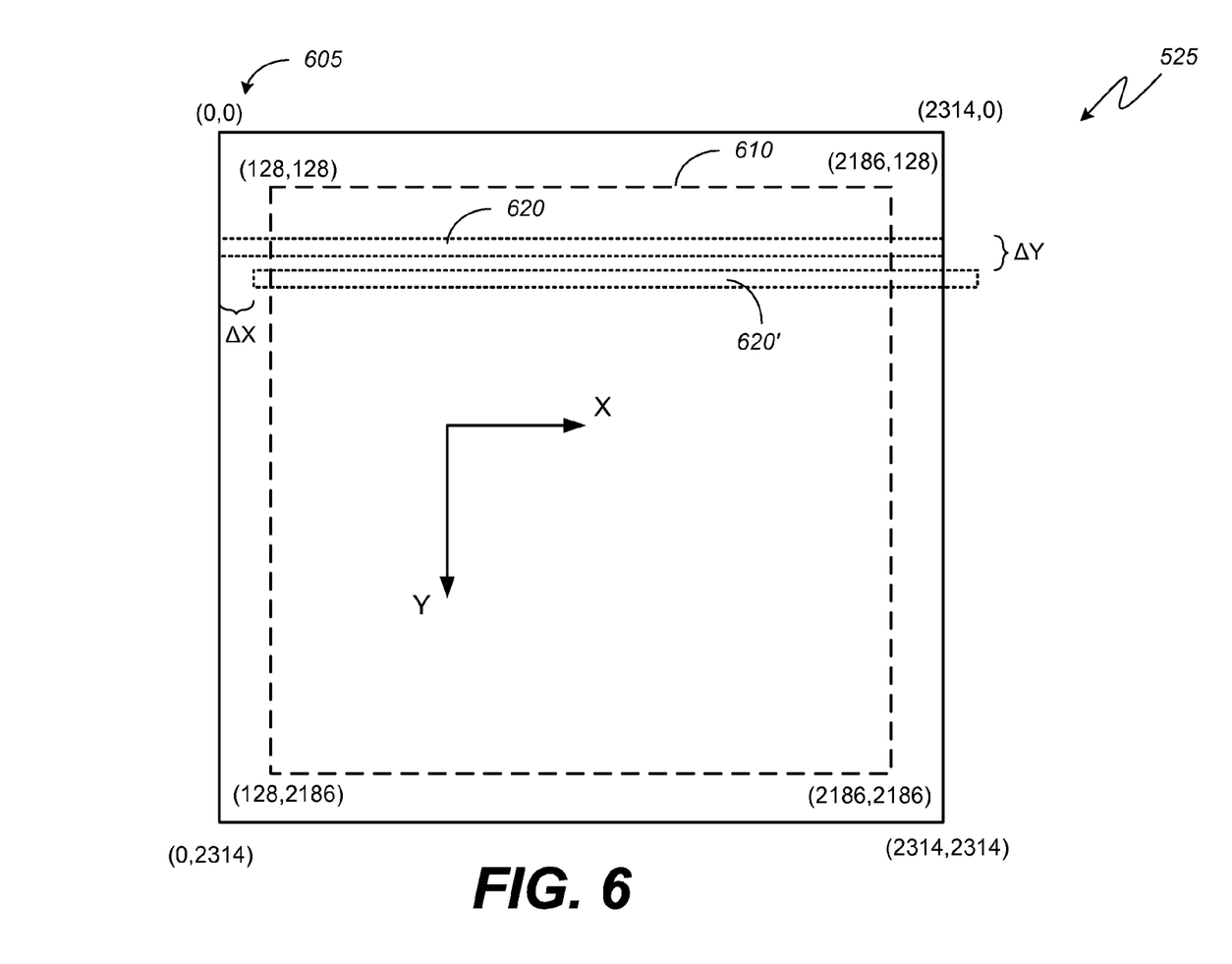
FIG. 6 is a schematic diagram illustrating an example application of offsets to modify an output image produced by the camera phone of FIG. 5.

FIG. 6 is a schematic diagram illustrating an example application of offsets to modify an output image produced by the camera phone 500 of FIG. 5. In the illustrated embodiment, the frame buffer 525 is arranged with 2,315 pixels in each of a first direction (X) and a second direction (Y)(i.e., pixels 0 through 2,314). Although the letters X and Y are used to define directions across the frame buffer 525, it should be understood that these directions are not the same as the optical axis or X-axis and the pitch or Y-axis illustrated in FIG. 1. When referring to the frame buffer 525, the X direction and the Y direction define the relative positions of rows and columns of storage elements corresponding to image information received from the image sensor 430. In fact, as described above, the light sensitive elements of the image sensor 430 are in a plane that is parallel to the pitch axis 114 of the body 110 and orthogonal to the optical axis 112 extending from the body 110 (FIG. 1).

In FIG. 6, a reference pixel 605 is defined in the upper left hand corner of the frame buffer 525. An output image frame 610 is arranged in the center of the frame buffer 525. In the present embodiment, the output image frame 610 leaves a barrier of 128 pixels between each of the edges of the frame buffer 525. The barrier permits a shift of up to 128 pixels in each direction (e.g., the negative X direction, the positive X direction, the negative Y direction, or the positive Y direction) while still filling the output image frame 610 with image information. An example scan line 620 is shown in its original location within the frame buffer 525. The example scan line 620 fills one entire row of the frame buffer 525. The scan line 620' illustrates how the processing module 524 will insert the image information in the frame buffer in accordance with a first or X offset and a second or Y offset. The X offset results in the image information being shifted in the positive X direction (i.e., to the right in FIG. 6) by the number of pixels defined by the value in the first offset store 522. The Y offset results in the image information being in the positive Y direction (i.e., to the bottom of frame buffer 525 in FIG. 6).

Figure 7:
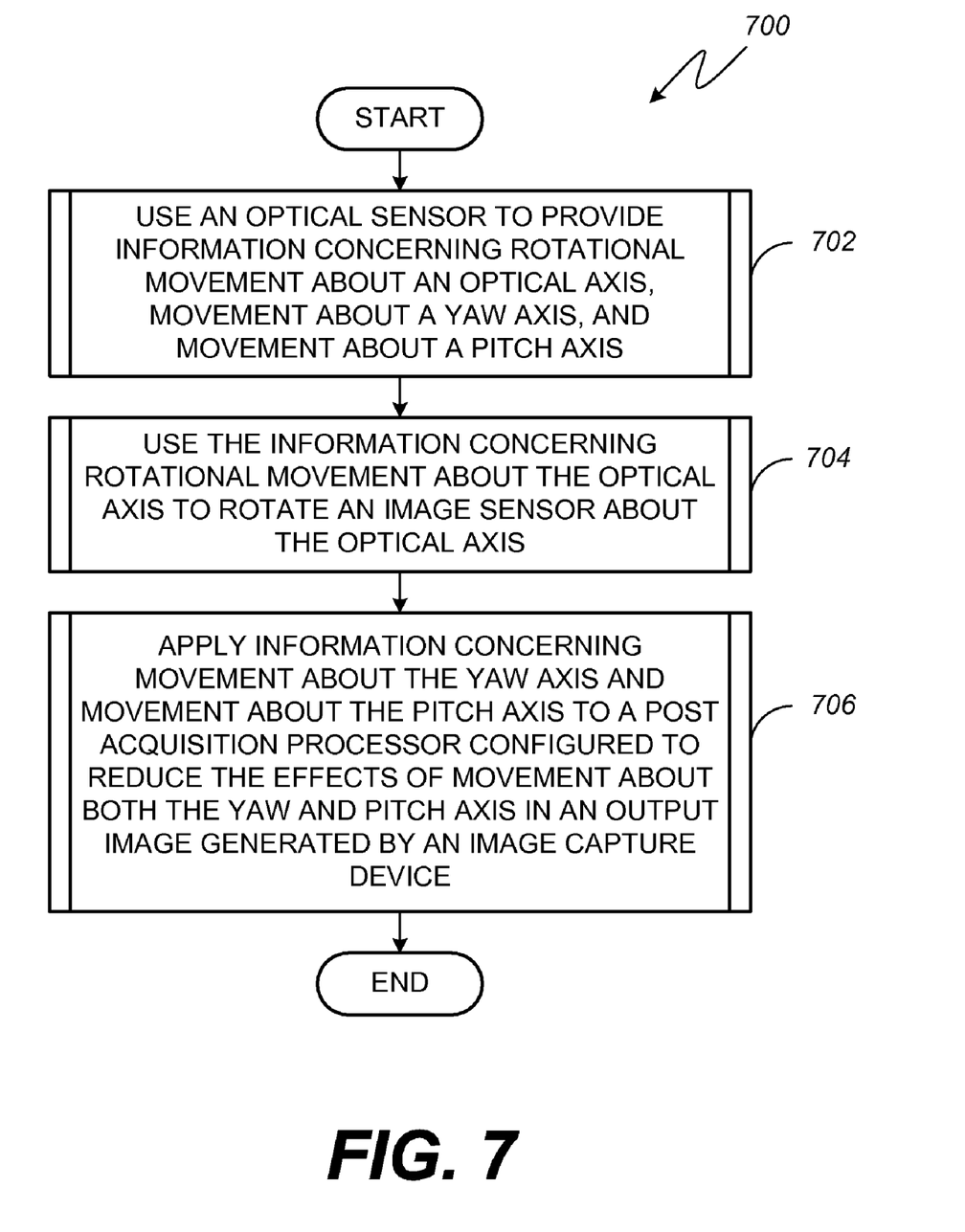
FIG. 7 is a flow chart illustrating an embodiment of a method for stabilizing an image.

FIG. 7 is a flow diagram illustrating an embodiment of a method for stabilizing an image. The flow diagram of FIG. 7 shows the architecture, functionality, and operation of a possible implementation via software and or firmware associated with an image capture device. In this regard, each block represents a module, segment, or portion of code, which comprises one or more executable instructions for implementing the specified function(s). When the image capture device 100 is implemented via hardware, hardware and firmware or a combination of hardware and software, one or more blocks in the flow diagram may represent a circuit or circuits.

Method 700 begins with block 702 where an optical sensor provides information concerning rotational movement about each of an optical axis, a yaw axis and a pitch axis. In block 704, information from the optical sensor concerning rotational movement about the optical axis is used to controllably rotate an image sensor about the optical axis. Thereafter, as indicated in block 706, information concerning movement about the yaw axis and movement about the pitch axis is used by a post acquisition processor configured to reduce the effects of movement about both the yaw axis and pitch axis in an output image generated by an image capture device.

Figure 8:
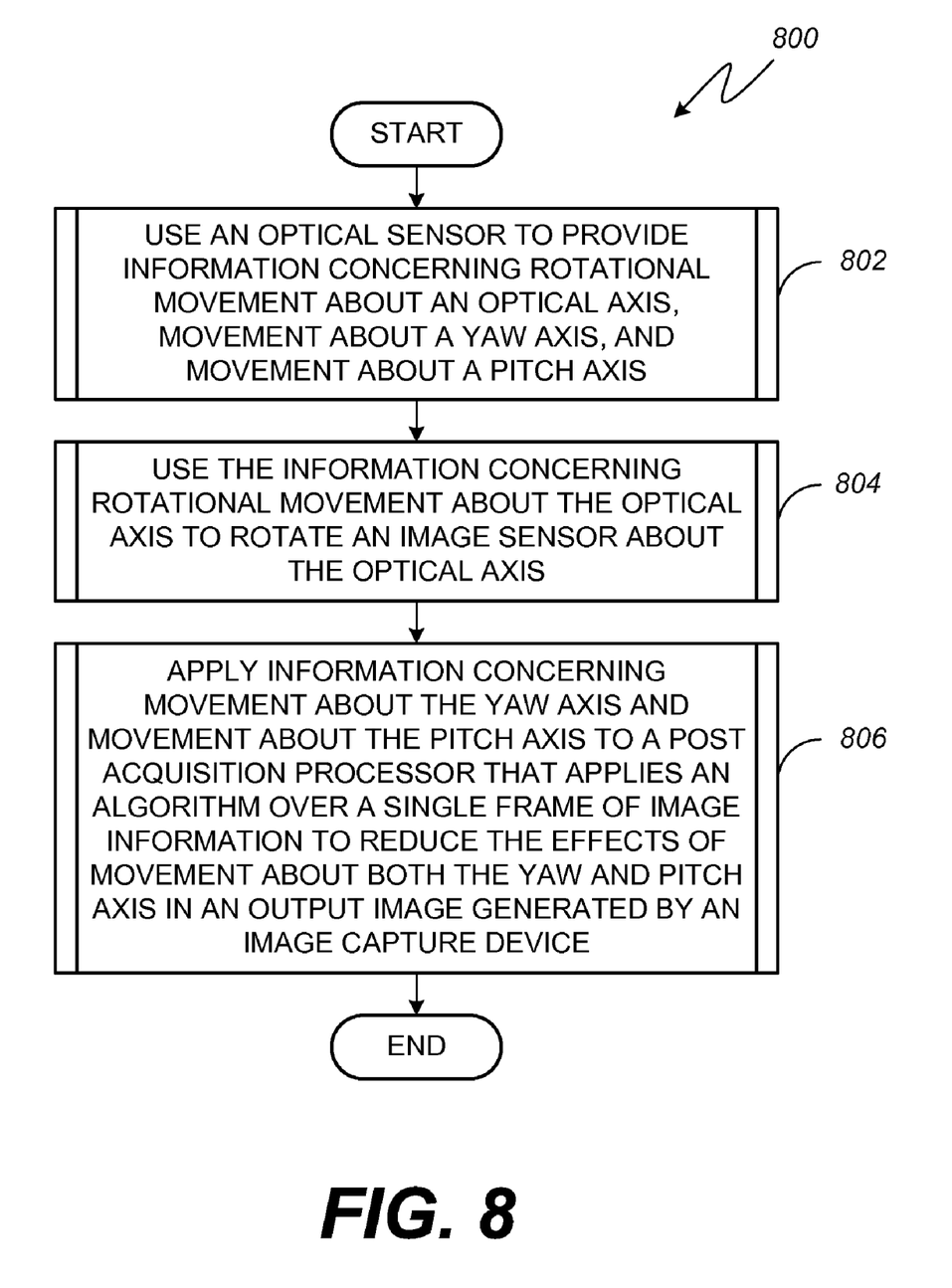
FIG. 8 is a flow chart illustrating an embodiment of a method for stabilizing an image using a single frame of image information to generate a modified image.

FIG. 8 is a flow chart illustrating an embodiment of an alternative method 800 for stabilizing an image. The flow diagram of FIG. 8 shows the architecture, functionality, and operation of a possible implementation via software and or firmware associated with an image capture device. In this regard, each block represents a module, segment, or portion of code, which comprises one or more executable instructions for implementing the specified function(s). When the image capture device 100 is implemented via hardware, hardware and firmware or a combination of hardware and software, one or more blocks in the flow diagram may represent a circuit or circuits.

Method 800 begins with block 802 where an optical sensor provides information concerning rotational movement about each of an optical axis, a yaw axis and a pitch axis. In block 804, information from the optical sensor concerning rotational movement about the optical axis is used to controllably rotate an image sensor about the optical axis. Thereafter, as indicated in block 806, information concerning movement about the yaw axis and movement about the pitch axis is used by a post acquisition processor that applies an algorithm over a single frame of image information to reduce the effects of movement about both the yaw axis and pitch axis in an output image generated by an image capture device.

Figure 9:
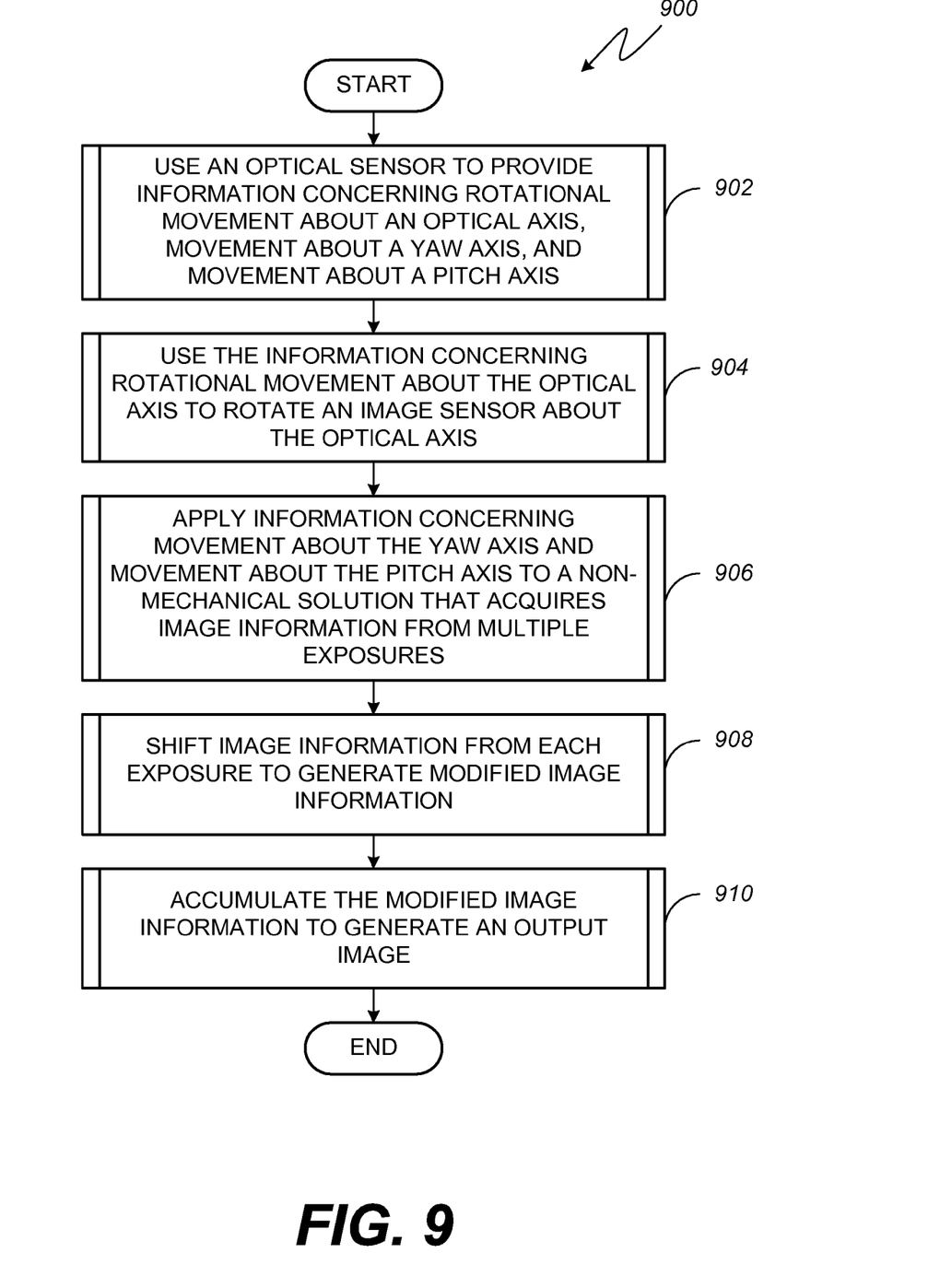
FIG. 9 is a flow chart illustrating an embodiment of a method for stabilizing an image using information from multiple exposures or segments to generate a modified image.

FIG. 9 is a flow chart illustrating an embodiment of another method 900 for stabilizing an image. The flow diagram of FIG. 9 shows the architecture, functionality, and operation of a possible implementation via software and or firmware associated with an image capture device. In this regard, each block represents a module, segment, or portion of code, which comprises one or more executable instructions for implementing the specified function(s). When the image capture device 100 is implemented via hardware, hardware and firmware or a combination of hardware and software, one or more blocks in the flow diagram may represent a circuit or circuits.

Method 900 begins with block 902 where an optical sensor provides information concerning rotational movement about each of an optical axis, a yaw axis and a pitch axis. In block 904, information from the optical sensor concerning rotational movement about the optical axis is used to controllably rotate an image sensor about the optical axis. Thereafter, as indicated in block 906, information concerning movement about the yaw axis and movement about the pitch axis is applied to a non-mechanical solution that acquires image information from multiple exposures. Next, as indicated in block 908, image information from each exposure is shifted to generate modified image information. Last, as indicated in block 910, the modified image information is accumulated to generate an output image.

While various embodiments of an image capture device and method for stabilizing an image by counteracting motion of the body of the image capture device have been described, it will be apparent to those of ordinary skill in the art that many more embodiments and implementations are possible that are within the scope of this disclosure. Accordingly, the described assemblies and methods for stabilizing an image are not to be restricted or otherwise limited except in light of the attached claims and their equivalents.

What is claimed is:

1. A method for stabilizing an image by counteracting motion of the body of an image capture device, the method comprising:
    using an optical sensor to provide information concerning rotational movement about an optical axis, movement about a yaw axis, and movement about a pitch axis, including generating multiple first offsets responsive to both movement in yaw and movement in pitch and generating multiple second offset responsive to both movement in yaw and movement in pitch;
    using the information concerning rotational movement about the optical axis to rotate an image sensor about the optical axis, the image sensor being different than the optical sensor; and
    applying information concerning movement about the yaw axis and movement about the pitch axis to a post acquisition processor configured to reduce the effects of movement about both the yaw axis and the pitch axis in an output image generated by the image capture device,
    wherein applying information concerning movement about the yaw axis and movement about the pitch axis to a post acquisition processor comprises applying a non-mechanical solution that comprises acquiring image data from multiple image segment exposure intervals of a frame exposure period at the image sensor, reading each line of the image data for each image segment exposure interval from the image sensor, shifting relative location of each line of the image data for each image segment exposure interval in accordance with the respective first and second offsets for that image segment exposure interval to produce shifted image data, and writing the shifted image data for each image segment exposure interval in a frame buffer to accumulate an output image in the frame buffer.

2. The method of claim 1, wherein applying information concerning movement about the yaw axis and movement about the pitch axis to a post acquisition processor comprises applying an algorithm over a single-frame of image information.

3. The method of claim 2, wherein applying an algorithm over a single-frame of image information comprises applying a deconvolution algorithm.

4. The method of claim 1, wherein using an optical sensor comprises using a three-axis optical sensor that comprises multiple optical arrays to provide the information concerning the rotational movement about the optical axis, the movement about the yaw axis, and the movement about a pitch axis.

5. A camera, comprising:
    a body housing a frame buffer coupled to a processor, a shutter, an actuator, and a three-axis optical sensor, the processor further coupled to the shutter, the actuator and the three-axis optical sensor; and
    an image sensor, the image sensor defining an optical axis, the image sensor being different than the three-axis optical sensor, the three-axis optical sensor having a roll axis that is parallel with the optical axis, a yaw axis that is orthogonal to the optical axis and a pitch axis that is orthogonal to both the optical axis and the yaw axis, the actuator configured to rotate the image sensor in accordance with information from the three-axis optical sensor responsive to rotation of the body about the optical axis, wherein the processor applies an image processing algorithm responsive to information from the three-axis optical sensor responsive to rotation of the body about the yaw axis and rotation of the body about the pitch axis,
    wherein the processor is configured to generate multiple first offsets responsive to both movement in yaw and movement in pitch and to generate multiple second offset responsive to both movement in yaw and movement in pitch, and
    wherein the processor is further configured to direct the image sensor to acquire image data from multiple image segment exposure intervals of a frame exposure period, to read each line of the image data for each image segment exposure interval from the image sensor, to shift relative location of each line of the image data for each image segment exposure interval in accordance with the respective first and second offsets for that image segment exposure interval to produce shifted image data, and writing the shifted image data for each image segment exposure interval in the frame buffer to accumulate an output image in the frame buffer.

6. The camera of claim 5, wherein the body further comprises one of a mobile phone, a portable computer, and a personal digital assistant.

7. The camera of claim 5, wherein the processor is configured to apply a deconvolution algorithm over a single-frame of image information.

8. The camera of claim 5, wherein the processor is configured to direct the frame buffer to transfer an output image to a memory store upon completion of a frame of image information.

9. The camera of claim 5, wherein the three-axis optical sensor comprises multiple optical arrays to provide the information responsive to the rotation of the body about the optical axis, the rotation of the body about the yaw axis and the rotation of the body about the pitch axis.

* * * * *